United States Patent [19]

Miller

[11] Patent Number: 4,790,880
[45] Date of Patent: Dec. 13, 1988

[54] INK-JET PRINTING COMPOSITIONS CONTAINING MACROCYCLIC POLYETHERS

[75] Inventor: Robert J. Miller, Burlingame, Calif.

[73] Assignee: Hewlett-Packard Company, Palo Alto, Calif.

[21] Appl. No.: 71,696

[22] Filed: Jul. 9, 1987

Related U.S. Application Data

[63] Continuation-in-part of Ser. No. 842,284, Mar. 21, 1986, abandoned.

[51] Int. Cl.$^4$ .............................................. C09D 11/02
[52] U.S. Cl. .......................................... 106/22; 106/20
[58] Field of Search .................................... 106/20, 22

[56] References Cited

U.S. PATENT DOCUMENTS 3,562,295  2/1971  Pederson ............................ 260/338
4,639,424  1/1987  Wong ................................. 436/74

FOREIGN PATENT DOCUMENTS 141134  5/1985  European Pat. Off. .

Primary Examiner—Amelia Burgess Yarbrough
Attorney, Agent, or Firm—William J. Bethurum

[57] ABSTRACT

An improved ink suitable for use in ink-jet printers is provided. The ink includes (a) a vehicle comprising at least one member selected from the group consisting of water and a water-soluble, non-aqueous component, and (b) an anionic dye having cations associated therewith. The ink composition is characterized by further including a macrocyclic polyether associated with the cations, the macrocyclic polyether having binding sites and a cavity size suitable for complexing the cations. The ink composition of the invention evidences reduced crusting, increased fade resistance and, for use in thermal ink-jet printers, reduced kogation.

32 Claims, No Drawings

INK-JET PRINTING COMPOSITIONS CONTAINING MACROCYCLIC POLYETHERS

CROSS-REFERENCE TO RELATED APPLICATION

The present application is a continuation-in-part application of Ser. No. 06/842,284, filed Mar. 21, 1986, now abandoned.

TECHNICAL FIELD

This invention relates to ink compositions for ink-jet printers, and, more particularly, to ink compositions containing at least one water-soluble, non-aqueous component in which certain properties thereof are improved by the addition of a macrocyclic polyether, more commonly known as a crown ether.

BACKGROUND ART

The use of aqueous-based inks for ink-jet printers is well-known. Such compositions are relatively inexpensive and easy to prepare; typically, the ink comprises water and a non-aqueous component such as a glycol ether, usually diethylene glycol, and a dye. Commonly, the water and glycol ether are present in generally the same proportion and the dye is desirably present up to about 6% (w/v) of the total composition, depending on the desired optical density of the print. The dye is usually an anionic dye commonly known as an acid or direct dye. Such anionic dyes typically include sulfonate ($SO_3^-$) or carboxylate ($CO_2^-$) groups, with which are associated alkali metal cations, such as sodium ($Na^+$).

The ink-jet printers which employ the foregoing ink compositions include an orifice, through which the ink is "jetted" or propelled onto a substrate, such as paper, mylar, and the like, and a reservoir of ink, from which ink is fed to the orifice.

The ink may be propelled by piezoelectric means or by thermal means. In the latter case, a hot resistor is used to rapidly vaporize a solvent, thereby causing the ejection of ink droplets toward the substrate.

Problems that occur with inks used in ink-jet printing include crusting, adverse reaction with nickel (used in the orifice), and kogation (a coined term unique to thermal ink-jet printing).

One mechanism by which crusting occurs is via a decrease in the water concentration of the ink in the vicinity of the orifice of the ink-jet printer due to evaporation, which results in the "salting out" of the dye, commonly known as "crusting", and causes blocking of the orifice. As a consequence, reduced print quality reliability is obtained.

Exposure of some inks to the nickel orifice results in fading of the first few printed characters upon exposure to light. Although the problem disappears after the printing of a few characters, it will reoccur with subsequent printing sessions spaced sufficiently apart in time.

Kogation occurs with thermal ink-jet printers and involves a thermally-induced decomposition product build-up on the hot resistor used to eject the ink droplets toward the substrate.

Attempts have been made to reduce or eliminate one or more of these problems. While many of these attempts have achieved a degree of success, a need remains to provide an improved ink for ink-jet printers.

SUMMARY OF THE INVENTION

In accordance with the invention, an ink composition for ink-jet printers is provided. The ink composition includes (a) a vehicle comprising at least one member selected from the group consisting of water and a water-soluble, non-aqueous component, and (b) an anionic dye having cations associated therewith.

The water-soluble, non-aqueous component may comprise at least one component selected from the group consisting of one or more glycols, short chain alcohols, alkanol amines, amides, sulfoxides, sulfones, and heterocyclic amines.

The ink composition of the invention is characterized by the addition of a macrocyclic polyether. Such polyethers are known complexing agents which solubilize alkali metal ions in non-polar solvents. The most stable macrocyclic polyether-alkali metal cation complexes are formed when the ratio of the polyether cavity radius and cation radius is close to unity. A substantial deviation from the perfect fit results in a loss of binding capacity. A process is also provided for improving the properties of a dye in an ink containing a non-aqueous component.

As a consequence of employing macrocyclic polyethers for at least partially complexing the cations of an anionic dye, the solubility of the dye in glycol-containing inks is enhanced. The increased solubility results in reduced crusting of the ink-jet printer orifice. Further, dye stability in the presence of nickel is increased. Finally, kogation is reduced in thermal ink-jet printers.

DETAILED DESCRIPTION OF THE PREFERRED EMBODIMENTS

Inks employed in ink-jet printing commonly comprise a vehicle, such as water and one or more glycols, and a dye. Anionic dyes are commonly employed in such inks.

All water soluble anionic dyes are typically found in dye application classes of acid and direct dyes. Additionally, the anionic dyes contain one or more sulfonic or carboxylic acid groups in their molecules. Chemically, the anionic dyes suitably employed in the invention consist of azo, anthroquinones, triarylmethane, and some stilbenes, thiazoles, phthalocyanines, and oxazines. Specific examples include (CI names) Food Black 2, Direct Black 19, Direct Blue 86, Acid Red 52, Acid Yellow 17, Acid Yellow 23, Acid Red 35, Direct Black 38, Direct Yellow 119, Acid Black 172, and Direct Black 112.

Suitable glycols employed in the practice of the invention include ethylene glycol, diethylene glycol, triethyelene glycol, propylene glycol, polyethylene glycol and the monomethyl ether derivatives thereof. The hygroscopic capacity and print quality dictates in part the amount of glycol employed. Preferably, the viscosity is maintained in the region of 5.5 to 6.5 cps, although viscosities as low as about 2 cps or as high as 10 cps have been employed.

While the vehicle may include water and/or one or more glycols, the vehicle may instead comprise water and one or more other water-soluble, non-aqueous components. Also, one or more of the glycols may be replaced by one or more of such other water-soluble, non-aqueous components. Examples of such other water-soluble, non-aqueous components include short chain alcohols such as isopropanol, alkanol amines, such as mono, di- and triethanolamine, amides, such as formamide and dimethyl formamide, sulfoxides, such as dimethyl sulfoxide, sulfones, such as sulfolane, and heterocyclic amines, such as N-methyl-2-pyrrolidone, and 1,3-dimethyl-imidazolidinone.

An example of a suitable black dye used in inks for ink-jet printers is available from Mobay Chemical Corp. (Union, N.J.), under the trade designation Mobay 7984 dye, generically known as C.I. Food Black 2. Like many anionic dyes, this anionic dye commonly has associated with it sodium cations. This dye has a high solubility in water, but a considerably lower solubility in diethylene glycol. The low solubility in diethylene glycol becomes significant in the vicinity of the ink-jet printer orifice, where the partial pressure derived from water decreases over a period of time and eventually results in crusting.

While the dye discussed above is a black dye, other black or other colored dyes, which are also anionic dyes having low solubility in non-aqueous solvents, may also be benefited by the practice of the invention, such as those listed above. The presence of the dye in the ink is typically about 1 to 8% (w/v), and preferably about 4 to 6% (w/v).

In accordance with the invention, the solubility of anionic dyes in non-aqueous-containing vehicles is increased by adding a macrocyclic polyether to the ink composition. For the purposes of this invention, the term "macrocyclic polyether" is used mainly to refer to cyclic compounds having at least four oxygen donor atoms, also commonly known as crown ethers. Open-chain polyethers, cryptands, poly(crown ethers) and all nitrogen-containing macroheterocycles are included to the extend that they behave as crown ethers. The preparation and properties of macrocyclic polyethers are described in U.S. Pat. No. 3,562,295.

The stability of crown ether-cation complexes depends on several factors: these include cavity size of the ligand, cation diameters, spatial distribution of ring binding sites, the character of the heteroatoms, the presence of additional binding sites and the type of solvent used. In aprotic solvents, the stability also depends on the nature of the anion.

The actual number of macrocyclic polyethers suitable for complexation with a given alkali cation is fairly large. However, for ink-jet printing applications, the polyethers must be commercially available. For this invention, only 15-Crown-5 (1,4,7,10,13-pentaoxacyclopentadecane [Chem. Abstr. Reg. No. 33100-27-51]), 18-Crown-6 (1,4,7,10,13,16-hexaoxacyclooctadecane [17455-13-9]), dibenzo-18-Crown-6 (2,3,11,12-dibenzo-1,4,7,10,13,16-hexaoxacyclooctdecane) [14187-32-7]), and dicyclohexane-18-Crown-6 (2,3,11,12-dicyclohexane-1,4,7,10,13,16-hexaoxacyclooctadecane) are both available and have the proper ratio of cavity radius to cation radius ($r_{ce}/r_{cat}$) for complexing sodium, potassium or ammonium cations. Where the cation is sodium, the macrocyclic polyethers preferably comprises the crown ethers 15-Crown-5 or 18-Crown-6. Finally, for use with anionic dyes containing lithium counter ions, 14-Crown-4 is commercially available. The most stable macrocyclic polyether complexes are formed when the ratio of cavity radius to cation radius is close to unity.

The macrocyclic polyether concentration is based on the ratio of macrocyclic polyether binding sites to cation concentration. This ratio is preferably about 0.5 to 2. A ratio of less than about 0.5 in these inks results in unacceptable crusting properties, while a ratio greater than about 2 is not only prohibitively expensive but also leads to compatibility problems with the polymers and elastomers in the ink cartridge. For 15-Crown-5, the concentration in terms of volume percent of the ink composition ranges from about 5% to 20%.

Commercial grade anionic dyes typically include excess amounts of sodium (and chloride). To reduce the cation concentration, and thus save on the quantity of macrocyclic polyether required, the dye may be purified prior to preparing the ink composition.

Purification of the dye employed in the invention is preferably accomplished by use of reverse osmosis (ultrafiltration). While ion exchange processes may be employed, such processes are more complex and expensive.

The purification process involves applying reverse osmosis, conveniently at room temperature, to a solution of the anionic dye in water so as to drive excess sodium (and chloride) ions across the polymer membrane of the reverse osmosis apparatus. As is well-known, the material passing through the membrane is called the "permeate", that which is left behind is called the "concentrate". The concentrate is cycled repeatedly through the reverse osmosis membrane to remove the excess sodium cations and chloride anions. Deionized water is added as necessary.

In the reverse osmosis process as applied to the foregoing composition, the concentrate has dye anions/sodium cations, sodium cations/chloride anions and water, while the permeate has primarily sodium and chloride ions and water.

During the reverse osmosis process, pressure is applied to force undesired species through a membrane. This membrane is typically a polymer such as cellulose acetate, available under the tradename "Super 50" from Osmonics (Hopkins, Minn.), or polysulfone, available under the tradename G-50 from De-Sal (Escondido, Calif.).

The applied pressure may range from about 20 to 200 or more psi. However, while higher pressures result in higher efficiencies, higher pressures also tend to force dye molecules through the molecular filter. Thus, pressure can be varied according to desired efficiencies of dye retention and time of processing required. Consistent with these considerations, a presure in the range of about 60 to 80 psi is preferably employed.

The reverse osmosis process is operated for at least about 1 hour, and preferably about 3 hours. The particular time and pressure employed will depend on the particular anionic dye and the desired efficiency of purification.

Following removal of the purified aqueous dye solution from the reverse osmosis process, the macrocyclic polyether and the desired glycol ether or other non-aqueous component are added to the purified dye solution to produce the final ink composition.

It should be noted that the best properties are obtained in terms of pen performance and print quality by formulating a 4 to 6% (w/v) concentration of the dye in the ink.

It will be appreciated that other compounds in minor amounts may be added to improve water fastness of the ink, increase bubble stability of the ink during jetting, and for other conventional purposes. The properties of the ink improved in accordance with the invention remain substantially unchanged with such additions. Further, the purity of all components is that employed in normal, commercial practice.

The ink compositions of the invention are suitably employed in ink-jet printers and evidence reduced crusting (due to the increased solubility of the dye in the non-aqueous portion of the vehicle), improved fade resistance to light and, in the case of thermal ink-jet printers, reduced kogation.

Improved fade resistance is measured by a reflux test. The ink composition is refluxed at 100° C. for 72 hours in the presence of nickel in approximately the same surface area to volume ration provided in an ink-jet printer, and the integrated transmission of the ink in the range of 350 to 700 nm is monitored. The improved composition of the invention evidences little change compared to conventional ink compositions.

For thermal ink-jet printers, the ink compositions of the invention evidence five to ten times lower kogation relative to comparable inks containing alternative solubilizers such as triethanol amine. The mechanism for initiating kogation is unknown. Kogation properties are determined by filling an ink cartridge and initially operating all heaters. After approximately 200,000 droplets, two heaters are switched off and for every additional 200,000 droplets, two additional heaters are turned off. This process continues until all heaters are switched off. Next, the orifice plate is removed and the heater surfaces are photographed by a camera mounted on a microscope. Finally, the photographs are evaluated for the presence of discoloration and the corresponding number of droplets or firing of the heater is taken as a measure of the onset of kogation.

EXAMPLES

Several ink compositions having a 50/50 diethylene glycol/water vehicle were prepared using Mobay 7984 black dye.

The first composition (Ink A) comprised 60 milliliters (ml) total volume, which included 1.5 ml of a macrocyclic polyether known as 15-Crown-5 (1,4,7,10,13-pentaoxacyclopentadecane), available from Aldrich Chemical Co. (Milwaukee, Wis.), together with 15 ml of the purified dye solution. The balance comprised 30 ml of diethylene glycol and 13.5 ml of water. The dye concentration was 4.5% (w/v).

The second composition (Ink B) comprised 60 ml total volume, which included 3.0 ml of 15-Crown-5, together with 15 ml of the purified dye solution. The balance comprised 30 ml of diethylene glycol and 13.5 ml of water. The dye concentration was 4.5% (w/v).

The third composition (Ink C) comprised 400 ml total volume, which included 40 ml of 15-Crown-5, together with 160 ml of the purified dye solution. The balance comprised 200 ml of diethylene glycol. The dye concentration was 4.5% (w/v).

The fourth composition (Ink D) comprised 100 ml total volume and included 50 ml of the purified dye solution and 50 ml of diethylene glycol. The dye concentration was 4.5% (w/v).

The fifth composition (Ink E) comprised 100 ml total volume and included 15% (v/v) Pontamine Black SP liquid available from Mobay Chemical Co. and 50 ml of diethylene glycol. The balance comprised 35 ml of water. The dye load gave an identical integrated absorption average between 350 and 700 nm as Inks A-D.

The properties of the various ink composition are listed in the Table below, including pH, viscosity in cps, surface tension in dyne/cm, crusting, fade resistance as measured by the reflux test, kogation and print quality. Results of the AMES test for mutagenesis properties are also given.

The viscosity and surface tension measurements were obtained with a Brookfield viscometer and Fisher tensiometer, respectively. The pH measurement was obtained with a combination electrode without a matrix corrections for the reference electrode. The crusting results were obtained by two different methods. Inks A-D were evaluated by placing ink cartridges containing the different inks in a 60° C. oven containing a drying agent. Periodically, the cartridges were taken out, evaluated by microscope and placed in a mechanism to test for print quality. Afterwards, the cartridges were returned to the oven. Ink E was evaluated by placing an orifice plate on a well of ink in a polytetrafluoroethylene block and then placing the block in the oven described above. Periodically, the block was removed and evaluated under a microscope for crustations.

The reflux and kogation tests were performed as described above. The print quality was evaluated by generating a print-out of a test pattern and visually comparing the print-out to references.

TABLE

Comparison of Properties of Several Inks, with and without Macrocyclic Polyether

| Measured Parameter | Ink Identity Code | | | | |
|---|---|---|---|---|---|
| | A | B | C | D | E |
| pH | 7–8 | 7–8 | 7–8 | 6–7 | 6–7 |
| Viscosity, cps | 5.5–6.5 | 5.5–6.5 | 5.5–6.5 | 5.5–6.5 | 5.5–6.5 |
| Surface tension, dyne/cm | — | — | 50–55 | 50–55 | 50–55 |
| Reflux, % decr. | | | | | |
| w/o Ni$^{++}$ | — | — | <5 | <5 | >10 |
| w/ Ni$^{++}$ | — | — | <5 | <5 | >50 |
| AMES Test | neg. | neg. | neg. | neg. | neg. |
| Kogation | good | good | good | good | marg. |
| Crusting properties | unaccep. | marg. | good | unaccep. | good |
| Print quality | good | good | good | good | good |

It will be seen that the inks containing the macrocyclic polyether evidenced improved properties compared to those evidenced by conventional inks.

Thus, there has been disclosed an ink composition for ink-jet printers which employs a macrocyclic polyether for improving the properties of the ink. Various changes and modifications will make themselves available to those of ordinary skill in the art, and all such changes and modifications are intended to fall within the scope of the invention as defined by the appended claims.

What is claimed is:

1. Ink composition for ink-jet printers including
   (a) a vehicle comprising at least one member selected from the group consisting of water and a water-soluble, non-aqueous component, and
   (b) an anionic dye having cations associated herewith, characterized in that said ink composition further includes a macrocyclic polyether associated with said cations, the macrocyclic polyether having binding sites and a cavity size suitable for complexing said cations.

2. The ink composition of claim 1 wherein said non-aqueous component comprises at least one member selected from the group consisting of glycols, the monomethyl ether derivatives thereof, short chain alcohols, alkanol amines, amides, sulfoxides, sulfones and heterocyclic amines.

3. The ink composition of claim 2 wherein said glycol is selected from the group consisting of ethylene glycol, diethylene glycol, triethylene glycol, propylene glycol and polyethylene glycol and monomethyl ether derivatives thereof.

4. The ink composition of claim 3 wherein said glycol consists essentially of diethylene glycol.

5. The ink composition of claim 4 wherein said vehicle comprises about 50% water and 50% diethylene glycol.

6. The ink composition of claim 1 wherein said dye ranges in concentration from about 1 to 8% by weight-volume.

7. The ink composition of claim 1 wherein said macrocyclic polyether binding sites to cation concentration ratio ranges from about 0.5 to 2.

8. The ink composition of claim 1 wherein said cations are selected from the group consisting of sodium, potassium, lithium and ammonium cations.

9. The ink composition of claim 8 wherein said cations comprises sodium cations.

10. The ink compositions of claim 8 wherein said macrocyclic polyether is selected from the group consisting of 15-Crown-5, 18-Crown-6, dibenzo-18-Crown-6, dicyclohexane-18-Crown-6 and 14-Crown-4.

11. The ink composition of claim 10 wherein said macrocyclic polyether consists essentially of 15-Crown-5, present in an amount ranging from about 5 to 20% by volume of said ink composition.

12. The ink composition of claim 11 wherein said macrocyclic polyether consists essentially of 1,4,7,10,13-pentaoxacyclopentadecane.

13. Ink composition for ink-jet printers comprising
(a) a vehicle comprising a mixture of water and at least one glycol selected from the group consisting of ethylene glycol, diethylene glycol, triethylene glycol, propylene glycol, polyethylene glycol and monomethyl ether derivatives thereof and
(b) an anionic dye having sodium cations associated therewith, said dye present in an amount ranging from about 1 to 8% by weight-volume, characterized in that said ink composition further comprises a macrocyclic polyether selected from the group consisting of 15-Crown-5, 18-Crown-6, dibenzo-18-Crown-6 and dicyclohexane-18-Crown-6, having binding sites for complexing said sodium cations, said macrocyclic polyether present in an effective amount to reduce crusting and fading associated with an ink-jet printer and additionally kogation associated with a thermal ink-jet printer.

14. The ink composition of claim 13 wherein said macrocyclic polyether binding sites to sodium cations concentration ranges from about 0.5 to 2.

15. The ink composition of claim 13 wherein said vehicle comprises about 50% water and about 50% diethylene glycol.

16. The ink composition of claim 13 wherein said dye is present in an amount ranging from about 4 to 6% by weight-volume.

17. The ink composition of claim 13 wherein said macrocyclic polyether consists essentially of 15-Crown-5, present in an amount ranging from about 5 to 20% by volume of said ink composition.

18. A process for improving the properties of an ink employed in ink-jet printing, said ink comprising a vehicle and an anionic dye having cations associated therewith, said vehicle comprising at least one member selected from the group consisting of water and a water-soluble, non-aqueous component, characterized in that a macrocyclic polyether is added to complex said cations, the macrocyclic polyether having binding sites and a cavity size suitable for complexing said cations.

19. The process of claim 18 wherein said dye ranges in concentration from about 1 to 8% by weight-volume.

20. The process of claim 18 wherein said non-aqueous component comprises at least one member selected from the group consisting of glycols, the monomethyl ether derivatives thereof, short chain alcohols, alkanol amines, amides, sulfoxides, sulfones and heterocyclic amines.

21. The process of claim 20 wherein said glycol is selected from the group consisting of ethylene glycol, diethylene glycol, triethylene glycol, propylene glycol, polyethylene glycol and monomethyl ether derivatives thereof.

22. The process of claim 21 wherein said glycol consists essentially of diethylene glycol.

23. The process of claim 22 wherein said vehicle comprises about 50% water and about 50% diethylene glycol.

24. The process of claim 18 wherein the ratio of the cavity radius of said macrocyclic polyether to the radius of said cation is close to unity.

25. The process of claim 18 wherein said macrocyclic polyether is added to provide a ration of macrocyclic polyether binding sides to cation concentration ranging from about 0.5 to 2.

26. The process of claim 18 wherein said cations are selected from the group consisting of sodium, potassium, lithium and ammonium cations.

27. The process of claim 26 wherein said cations comprise sodium cations.

28. The process of claim 27 wherein said macrocyclic polyether is selected from the group consisting of 15-Crown-5, 18-Crown-6, dibenzo-18-Crown-6, dicyclohexane-18-Crown-6 and 14-Crown-4.

29. The process of claim 28 wherein said macrocyclic polyether consists essentially of 15-Crown-5 and is added in an amount ranging from about 5 to 20% by volume of said ink composition.

30. The process of claim 29 wherein said macrocyclic polyether consists essentially of 1,4,7,10,13-pentaoxacyclopentadecane.

31. Ink composition for ink-jet printers consisting essentially of
(a) water,
(b) a water-soluble, non-aqueous component selected from the group consisting of glycols, the monomethyl ether derivatives thereof, short chain alcohols, alkanol amines, amides, sulfoxides, sulfones, and heterocyclic amines,
(c) an anionic dye having cations associated therewith and
(d) a macrocyclic polyether having binding sites and a cavity size suitable for complexing said cations.

32. A process for improving the properties of an ink employed in ink-jet printing, said ink consisting essentially of
(a) water,
(b) a water-soluble, non-aqueous component selected from the group consisting of glycols, the monomethyl ether derivatives thereof, short chain alcohols, alkanol amines, amides, sulfoxides, sulfones, and heterocyclic amines, and
(c) an anionic dye having cations associated therewith, characterized in that a macrocyclic polyether is added to complex said cations, the macrocyclic polyether having binding sites and a cavity size suitable for complexing said cations.

* * * * *